A. B. MITCHELL.
TRAVERSE TABLE.
APPLICATION FILED JULY 25, 1910.

1,232,706. Patented July 10, 1917.

UNITED STATES PATENT OFFICE.

ARTHUR B. MITCHELL, OF BIRMINGHAM, ALABAMA.

TRAVERSE-TABLE.

1,232,706.  Specification of Letters Patent.  Patented July 10, 1917.

Application filed July 25, 1910. Serial No. 573,788.

*To all whom it may concern:*

Be it known that I, ARTHUR B. MITCHELL, a citizen of the United States, residing at Birmingham, in the county of Jefferson and State of Alabama, have invented new and useful Improvements in Traverse-Tables, of which the following is a specification.

My invention relates to improvements in a book of calculating tables for use in determining the latitudes and departures, the northings or southings and eastings or westings, or cosines and sines, respectively, of bearings, courses, angles, or arcs, as the case may be, and comprises data whereby the aforesaid functions may be readily and accurately ascertained for any distance.

The primary object of a traverse table being to determine with the least amount of time and labor the position of any point, of a defined angular course and distance from the point of beginning of a course, and to show its relative position either horizontally or perpendicularly, or both from such beginning point. Various forms of such tables have been from time to time devised whereby relative perpendicular and horizontal distances have been found for each angle of the quadrant by multiplying the natural sine or cosine of each angle by the tabular distances and the results thus obtained then set down in horizontal or vertical columns, according to the inclination of the inventor, and referred to by appropriate reference numerals corresponding to such tabular distances.

A traverse table extensively used by mathematicians and engineers comprises a volume of 270 full pages devoted to traverse tables alone, requiring pages fourteen inches long and nine inches in width, three pages are required representing the data concerning each degree, the distances are disposed in horizontal columns reading downward from 1 to 100 and the minutes of the angle or arc arranged vertically. One-half of each page is devoted to cosines consisting of 10 vertical columns showing 10 minutes of a given degree, the other half of the page showing in the same manner the corresponding sines.

Another traverse table used arranges the distances in vertical columns 1 to 10, and minutes reading horizontally, with cosines and sines both in parallel columns and referred to by and disposed vertically under the same figures used to designate distances.

These books of traverse tables, by reason of their employment of the additional or "10" column for distances are necessarily larger, requiring much more space in carrying, and are incapable of being sufficiently reduced in size in their present form, to effect a pocket edition, and still preserve its legibility, unless their accuracy is materially affected by reducing the number of decimal points to which the data is carried.

None of the traverse tables coming within the scope of my observation have extended their calculations to more than five decimal places.

The main object of my invention is to so arrange the data comprised in my book of tables that the information sought shall be clearly distinct and quickly obvious, revealing the fullest amount of such information in the most compact and legible form. It is my purpose to present the data in a volume having but ninety pages and which will fit into the pocket of a coat or like receptacle or, in other words, be of what is generally known as "pocket edition" size for convenience in field use. The presentation of data is thus limited by two factors, viz: the number of pages and the size of the page, and in addition thereto the matter of convenient use requires that the data be printed large enough to be readily legible, and arranged so that there will be but little chance of error in selecting data from the tables. According to my invention I propose to present the tables in a pocket edition using numbers carried to a greater number of decimal places than is customary in similar tables now in use, thereby increasing the accuracy of the tables; to present such numbers in type large enough to be easily legible; to arrange all the data for one degree of a quadrant relating to latitudes on one page and departures on the opposite page, making only ninety pages in the tables; to present the latitudes for a given degree on one page and the departures for said degree on the opposite page; and what is most important, to present all said data on pocket size pages by eliminating all superfluous data comprised in other tables, and utilizing the space thus obtained to increase the accuracy of my tables but not the size of the book.

One advantage of my invention is by my arrangement of the data so that the latitude, northing or southing, or cosine of any angle, arc or bearing for every minute of the same for each degree of a quadrant, will appear on a separate page, while the corresponding departure, easting or westing, or sine will appear on the opposite page. I eliminate the confusion incident to other systems where companion columns for both latitudes, etc., and departures, etc., are shown on the same page.

Another advantage of my invention is that the information sought for any angle, arc or bearing, is clearly shown on the same horizontal line opposite the minutes in the vertical column of the minutes on the page showing the given degree of angle, etc.

This arrangement being effected by presenting first the latitudes on one page and departures of the same angles on the opposite page at the top of the page, reading from the beginning of the tables or 0° to the end of same or 45°, thus the latitudes and departures for 45° or one-half of the quadrant are presented, and, as the differences between 90° and the angles and their functions presented are respectively the complemental angles and functions of the quadrant therefore the latitudes and departures, cosine and sine, etc., are found for remaining angles of the quadrant 45° to 90° by reading from the end of the tables from right to left across the bottom toward the beginning in reverse order. That is the pages showing latitude at top of pages will show departure at the bottom of same page, which will be the departure for angle representing the difference between the angle at top of page and 90°.

Another advantage of my invention is the reduction and limitation of the number of columns containing distances to nine (9) or one for each of the nine digits, where other systems show various arrangements of ten or more columns.

These and other advantages which are devised from the arrangement and combination of data in my present book of traverse tables are more fully hereinafter described, reference being had to the accompanying drawing, wherein the figure indicates my improved book of traverse tables open so as to show one page of latitudes, etc., of angle at the top of the page and the departures, etc., of the complement angle at the bottom of the same page, and another page of the book showing the departures, etc., of a different angle at the top of the page and the latitudes, etc., of the complement angle at the bottom of the same page.

According to the drawing the book comprises essentially ninety pages 1 corresponding to the 90° of the trigonometrical quadrant, and a sufficient number of explanatory pages may be added, there appearing to be eight in this instance, and the book therefore is opened on pages 38 and 69, the latitudes, etc., of the angles, arcs, or bearings of 15° to 16° and the departures, etc., of the corresponding complement angles, etc., 74° to 75°. Appearing on page 38, the departures, etc., for 15° to 16° would appear as reading from the top downward on page 39 if shown, and latitudes, etc., of the complements would appear at the bottom of page 39 reading from the bottom upwardly, as shown on page 69 for angles, arcs, or bearings 30° to 31°, and the complements 59° to 60°. Each page is ruled into sixty-one horizontal columns 2, which columns are headed at the left by the numerals from "0" to "60" inclusive, reading downward, and are headed at their right hand ends by the same numerals reading upward. These two rows of numerals are arranged in vertical columns 3 and 4, the column 3 being headed at the top by the abbreviation "M" for minutes and the column 4 being headed at the bottom by the same abbreviation "M". Between the columns 3 and 4 the sheet is divided into nine vertical columns 5 headed at the top and bottom by the numerals from 1 to 9, inclusive, reading from left to right. The left hand pages at their tops are each headed by the word "Latitudes" and at their bottoms by the word "Departures." At the upper left hand corner of the page the degree to which the data on that page, relative to latitudes pertains, is indicated by inserting a given degree and also the succeeding degree, as for instance, 15° to 16°, indicating that the page will contain all data relating to an angle from 15° to 16°, both inclusive. The pages are marked at their upper left hand end by the word "Cosine" and at the bottom of the columns 5 by the word "Sine," there appearing at the lower right hand corner of the page the complementary angles to the angles appearing at the upper left hand corner, or in other words, the page illustrated shows angles from 15° to 16° and 74° to 75°, the minutes for intermediate angles from 15° to 16° being read downwardly in the column 3 and from 74° to 75° being read upwardly in the column 4. The right hand pages are each headed by the word "Departures" at the top and by the word "Latitudes" at the bottom. The degree to which the data pertains are indicated in the same way as in the case of the left hand pages, the word "Sine" appearing at the top of the columns 5 and the word "Cosine" appearing at the bottom. The words "cosine" and "latitudes" are corresponding expressions as are "sines" and "departures."

The vertical columns 1 to 9 shown at the top and bottom of the page are used to represent distances, which when used in combination can be made to express any distance from naught (0) to infinity, it being obvious that the expression can be easily made by moving the decimal point as many places to the right as there are figures in the whole number less one, and, on the other hand to express a decimal quantity, the decimal point is moved as many places to the left as there are multiples of ten in the division, the intervening places between the decimal point and the first digit to the right of it being filled in with ciphers.

In column 5, which is headed "1", on each page of the tables appear the natural cosines of the angles, arcs or bearings shown on the page reading downward on the left hand pages and upward on the right hand pages, while the corresponding natural sines are found in the same column by reading from the bottom upward on the left hand page and from top downward on the right hand page. The other columns 5 head "2", "3", etc., to 9, represent, respectively, 2, 3, etc., to nine times the natural cosines and sines as next above described. In the vertical columns 5 the first three numerals, were duplicates of a preceding number, reading downwardly are not repeated, but in using the table they will be read in with the succeeding four numerals of the number, as on page 38. In the vertical columns headed "1" the expression for the angle of 15° 1' is .9658505 and on page 69 the expression for the angle of 59° 1' is .5147887.

It will be noted that I carry out the expressions in my table to seven decimal points which gives great accuracy, particularly in making calculations for long courses. The expressions may be carried to a lesser number of decimals if desired, but obviously the greater number of decimal places to which the expressions can be carried without sacrificing legibility or increasing the size of the page, the more desirable the tables will be.

While I have stated that the data on each page is arranged in sixty-one horizontal columns, the horizontal lines defining these columns need not necessarily be shown. I prefer to use spaced horizontal lines between groups of horizontal columns 2 of data to assist in guiding the eye as it follows the columns across the page. As shown one of these lines appears below each fifth column 2 except at the bottom of the page where six columns 2 are grouped. Also the more important advantages derived from my method of presenting the data will be secured irrespective of whether each page shows the calculations for both the columns 2 headed "0" and "60", as one or the other of these columns of data would be available on the preceding or succeeding page of latitudes or departures, as the case may be.

Having thus described my invention, what I claim as new and desire to secure by Letters Patent, is:—

1. As an article of manufacture, a pocket edition book of traverse tables comprising pages of tables, all data pertaining to the angles and complementary angles for the minutes intervening between a given degree and the succeeding degree being arranged on a pair of oppositely facing pages, the data for latitudes being disclosed on one page and for departures on the opposite page of each pair, each page having the data thereon arranged in horizontal columns successively headed at the left by the numerals from 0 to 60 reading down and headed at the right by the same numerals reading from the bottom up, all the data on a page being disposed in only nine vertical juxtaposed columns, which nine vertical columns contain tabulated data and from left to right are headed by the nine digits, each page for latitudes or departures successively bearing indicia at its top showing the same angle to which the data thereon as read downwardly pertains and its bottom bearing indicia designating the complementary angle to that indicated by the indicia at the top of the pages.

2. As an article of manufacture, a book of traverse tables comprising pages, of a size adapted for pocket use, there being a series of pairs of oppositely facing pages, each pair of pages containing all data pertaining to the angles and complementary angles for the minutes intervening between a given degree and the succeeding degree, there being indicia designating said degree which is displayed at the top of each page of a pair and indicia displayed at the bottom of the page indicating the complementary degree to that displayed by the indicia at the top of the page, all data pertaining to latitudes being arranged on a corresponding page of each pair and the data pertaining to departures being arranged on the other and corresponding pages of said pairs, said pages having the data arranged thereon in sixty-one horizontal columns and being ruled at each side to form a vertical column, the column at the left at its top and the column at the right at its bottom being marked to indicate minutes, said horizontal columns of data being headed by numerals from 0 to 60 in said minute columns, said numerals being arranged in numerical order as read downwardly on the left and being reversed and as read upwardly on the right, also each page being ruled into only nine vertical juxtaposed columns headed by a digit, the front column on the left being headed by "1," the second by "2," etc., and the last by "9," and said data, presenting calculations carried out to more than five decimal places, appropriately arranged in said vertical columns.

3. As an article of manufacture, a book of traverse tables condensed, a plurality of pages of tabulated data, each pair of oppositely facing pages having the data displayed thereon as read downwardly for the angles of one degree between 0° to 45°, and the data on each pair of pages as read upwardly being for the angles of the degree which is complementary to the degree with reference to which the data is readable downwardly, there being appropriate degrees displayed at the top and bottom of each pair of pages to indicate the degrees as read downwardly or upwardly to which the data thereon pertains, there being only nine vertical columns of data arranged on each page and all the data pertaining to latitudes being arranged on a corresponding page of each pair and the data relating to departures being displayed upon the other page of each pair, said vertical columns of data having digits at their tops from "1" to "9" successively reading from left to right, and the data in said vertical columns being arranged in horizontal columns headed at their left by minutes of the degree displayed at the top of the page and being headed at their right hand ends by the minutes of the degree displayed at their bottom and read from the bottom upward, the corresponding horizontal columns of data relating to latitudes and departures for a given minute of a degree being arranged in transverse alinement in the oppositely facing pair of pages, the main body of each page inclosed in the marginal index columns for minutes and numbers being wholly occupied by closely associated vertical columns of tabulated calculations, substantially as described.

4. A traverse table comprising pages having data displayed thereon in intersecting horizontal and vertical columns, there being appropriate designations for minutes of a degree heading the horizontal columns, similarly headed horizontal columns being disposed in alinement across a pair of oppositely facing pages, the vertical columns on each page being similarly headed by the digits from one up, and all data relating to latitudes for a given angle being displayed in the columns of one page and the data relating to departures from the same angle being displayed in the columns of the opposite page, substantially as described.

In testimony whereof I have hereunto set my hand in presence of two subscribing witnesses.

ARTHUR B. MITCHELL.

Witnesses:
S. F. FOSHEE,
NOMIE WELSH.

Copies of this patent may be obtained for five cents each, by addressing the "Commissioner of Patents, Washington, D. C."